United States Patent
Rettig et al.

(10) Patent No.: US 11,396,207 B2
(45) Date of Patent: Jul. 26, 2022

(54) WHEEL HUB UNIT WITH THERMALLY INSULATING COATING FOR REDUCING THE THERMAL LOAD ON A WHEEL BEARING

(71) Applicant: Ford Global Technologies, LLC, Dearborn, MI (US)

(72) Inventors: Marc Oliver Rettig, Cologne (DE); Thomas Wilwers, Cologne (DE); Clemens Verpoort, Monheim am Rhein (DE); Eckhard Voss, Dillenburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 585 days.

(21) Appl. No.: 16/041,992

(22) Filed: Jul. 23, 2018

(65) Prior Publication Data
US 2019/0024743 A1 Jan. 24, 2019

(30) Foreign Application Priority Data
Jul. 21, 2017 (DE) .......................... 102017212608.6

(51) Int. Cl.
*B60B 27/00* (2006.01)
*F16D 65/12* (2006.01)
(Continued)

(52) U.S. Cl.
CPC ........ *B60B 27/0052* (2013.01); *F16D 65/123* (2013.01); *B60B 30/00* (2013.01);
(Continued)

(58) Field of Classification Search
CPC ................. B60B 27/0052; B60B 27/00; F16D 2069/009; F16D 69/0408; F16D 69/026;
(Continued)

(56) References Cited

U.S. PATENT DOCUMENTS 3,390,750 A    7/1968  Albertson
9,187,612 B2 * 11/2015  Grivei ...................... H01B 1/24
(Continued)

FOREIGN PATENT DOCUMENTS

DE    3012420        10/1981
DE    3012420 A1 *  10/1981  .............. F16C 35/06
(Continued)

OTHER PUBLICATIONS

Michael F. Ashby, in Materials Selection in Mechanical Design (Fourth Edition), 2011 accessed at https://www.sciencedirect.com/topics/engineering/low-thermal-diffusivity on Dec. 17, 2020. (Year: 2011).*

*Primary Examiner* — Scott A Browne
(74) *Attorney, Agent, or Firm* — Burris Law, PLLC

(57) ABSTRACT

The present disclosure relates to a wheel hub unit of a motor vehicle and to a method for producing such a wheel hub unit. The wheel hub unit includes a wheel hub and a contact flange firmly connected to the wheel hub. The contact flange includes a plurality of fastening elements for fastening a wheel rim, as well as a contact surface which is intended to come into mechanical contact, at least in part, with a brake hat of a brake disk when the brake disk is in the mounted state. At least part of the contact surface is provided with a thermally insulating coating. Alternatively, the entire contact surface is provided with the thermally insulating coating.

18 Claims, 4 Drawing Sheets

(51) Int. Cl.
*B60B 30/00* (2006.01)
*C23D 7/00* (2006.01)
*C23D 5/02* (2006.01)
*F16C 33/60* (2006.01)
*F16D 65/84* (2006.01)
*F16D 69/02* (2006.01)
*F16D 65/02* (2006.01)

(52) U.S. Cl.
CPC ................ *C23D 5/02* (2013.01); *C23D 7/00* (2013.01); *F16C 33/605* (2013.01); *F16D 65/125* (2013.01); *F16D 65/127* (2013.01); *F16D 65/84* (2013.01); *F16D 69/026* (2013.01); *F16D 2065/1384* (2013.01); *F16D 2065/1392* (2013.01); *F16D 2200/003* (2013.01); *F16D 2250/0046* (2013.01); *F16D 2250/0084* (2013.01)

(58) Field of Classification Search
CPC ...... F16D 65/125; F16D 65/127; F16D 65/84; F16D 2065/1392; F16D 2200/003; F16D 2250/0046; F16D 2250/0084; F16D 65/123; C23D 5/02; F16C 33/605
See application file for complete search history.

(56) References Cited

U.S. PATENT DOCUMENTS

2007/0147719 A1* 6/2007 Komori .................. F16C 19/52
  384/492
2016/0025167 A1 1/2016 Broda et al.
2016/0348744 A1* 12/2016 Broda ...................... C03C 4/20

FOREIGN PATENT DOCUMENTS

| DE | 19708901 | 9/1998 | | |
|----|----------|--------|---|---|
| DE | 10132429 | 2/2002 | | |
| DE | 102015200054 | 8/2015 | | |
| DE | 102015200054 A1 * | 8/2015 | ........... | F16D 65/127 |
| WO | 2012/003848 | 1/2012 | | |
| WO | WO-2012003848 A1 * | 1/2012 | ................ | B22F 7/06 |

* cited by examiner

WHEEL HUB UNIT WITH THERMALLY INSULATING COATING FOR REDUCING THE THERMAL LOAD ON A WHEEL BEARING

CROSS-REFERENCE TO RELATED APPLICATIONS

This application claims priority to and the benefit of German Application 102017212608.6 filed on Jul. 21, 2017. The disclosure of the above application is incorporated herein by reference.

FIELD

The present disclosure relates to a wheel hub unit of a motor vehicle. The present disclosure further relates to a method for producing such a wheel hub unit.

BACKGROUND

The statements in this section merely provide background information related to the present disclosure and may not constitute prior art.

Conventional brake disks for motor vehicles are primarily produced from a blank of gray cast iron (GG15, GG25 (DIN)) or ductile iron (cast iron with graphite nodules: GGG60, GGG70 (DIN)) by machining, for example by turning. Proposals are known from the prior art for replacing the heavy gray cast iron material with aluminum. Because of aluminum's low density, the weight of the brake disk may in this way be reduced by around 50%. To provide the brake disk with the necessary abrasion resistance, the use of aluminum alloys with an elevated silicon content of 20% to 40% has been proposed, which markedly increases the melting point over conventional aluminum alloys. Such aluminum alloys may be produced for example using spray forming.

Alternatively, DE 10 2015 200 054 A1 proposes a method for producing a brake disk for a vehicle in which a protective layer is arranged on a base member of the brake disk. The base member is formed of aluminum or of an aluminum alloy. It is proposed that the method comprise at least the following steps:

pre-machining at least the friction surfaces of the base member in blank form;

applying an enamel coating as corrosion protection and/or antiwear layer at least on the friction surfaces of the brake disk; and post-treating the base member coated at least in places, wherein the enamel coating bonds metallurgically to the base material of the base member.

Furthermore, U.S. Pat. No. 3,390,750 describes a friction member for wet clutches and brakes, having a backing member and at least one sintered, porous and metallic friction lining with a porosity of at least 50% applied to the backing member. In one exemplary embodiment, the friction linings are hardened and the durability of the outer friction surfaces increased by this measure, wherein the hardening of these outer surfaces proceeds by the application of a vitreous enamel coating to the fibers. To this end, once the friction lining of sintered metal fibers has been firmly applied to the backing member, an enamel frit in the form of a slip is applied to the friction surfaces. The friction members are then introduced into a furnace which has been heated sufficiently for the frit to melt and penetrate into the cavities in the friction linings.

In addition, U.S. Patent Publication No. 2016/0025167 A1 describes a brake disk with a base member and a method for producing such a brake disk. The method may include roughening of at least one area/areas of a surface of the base member of the brake disk, wherein a metal coating is formed as a corrosion- and/or wear-resistant coating at least on the roughened area/areas of the surface of the base member. An enamel slip is applied as an anticorrosion coating at least in a transitional region between the roughened area/areas of the base member and the brake hat. The applied enamel slip is dried. The base member is heated to form the enamel coating and to bond the metal coating metallurgically to the base member. The enamel coating may be applied to an inner and outer side of the stated regions.

However, a brake disk of the stated type also has disadvantages. When performing brake tests such as for example what is known as the AMS (auto motor and sport) test, temperatures of above 750° C. are measured at the brake disk after repeatedly braking to a standstill from a speed of 115 km/h or even 135 km/h. Aluminum or the described aluminum alloys have a thermal conductivity $\lambda$ and diffusivity $\lambda/(c\cdot\rho)$, (c: specific heat capacity, $\rho$: density) many times higher than that of gray cast iron materials, such that the frictional heat and temperature arising during the brake test is dissipated more rapidly not only to the ambient air, but also to the wheel hub on which the brake disk is conventionally mounted. This results in a risk of damage to the wheel bearing through overheating of the bearing lubricant, which is conventionally formed of bearing grease, or indeed damage to electronic components, such as for example sensor units for an antilock braking system (ABS) or the like.

In the light of the indicated prior art, the region of the wheel hub units, which are used in combination with brake disks of aluminum or an aluminum alloy, still offers room for improvement with regard to heat dissipation.

SUMMARY

The present disclosure provides a wheel hub unit which can be operated durably, reliably and thermally compatibly in combination with a brake disk of aluminum or an aluminum alloy. The present disclosure also provides a method for producing such a wheel hub unit.

It should be noted that the features and measures listed individually in the following description may be combined in any desired, technically expedient manner and disclose further configurations of the present disclosure. The description additionally characterizes and gives details of the present disclosure in particular in connection with the figures.

The motor vehicle wheel hub unit according to the present disclosure comprises a wheel hub and a contact flange firmly connected to the wheel hub. The contact flange comprises a plurality of fastening elements for fastening a wheel rim, as well as a contact surface which is intended to come into mechanical contact at least in part with a brake hat of a brake disk when the brake disk is in the mounted state. According to the present disclosure, at least part of the contact surface is provided with a thermally insulating coating. Also, the contact surface with the thermally insulating coating may be on at least one of a circumferential surface of the wheel hub and a circumferential surface of the contact flange.

The frictional heat arising at a brake disk which has become very hot as a result of repeated actuation is dissipated from said disk by natural convection (when stationary) or forced convection (in an airstream), by emission into the surrounding environment or by thermal conduction to support structures of the brake disk which are formed by the contact flange and the wheel hub. The proportions of heat dissipated by the respective heat dissipating mechanisms depend on the temperature of the hot brake disk, on external conditions (stationary, traveling) and the heat conduction properties of the materials used for the support structures.

The present disclosure is based on the concept of increasing the proportions of heat dissipated by natural or forced convection and by emission to the surrounding environment and of reducing the proportion of heat dissipated by thermal conduction into the support structures by introducing elevated thermal resistance into a heat conducting path by the thermally insulating coating.

In this way, the quantity of heat dissipated via the heat conducting path to the wheel hub and in particular to a bearing lubricant of the wheel bearing may be reduced and overheating of the bearing lubricant may be effectively inhibited.

For the purposes of the present disclosure, a "vehicle" should be understood in particular to mean a private car, a truck or motor bus.

For the purposes of the present disclosure, the expression "provided for the purpose" should in particular be taken to mean specifically designed or arranged therefor.

In an advantageous form of the wheel hub unit, the part provided with the thermally insulating coating includes at least part of a circumferential surface of the wheel hub and/or at least part of a circumferential surface of the contact flange. As a result of manufacturing tolerances, for example when arranging the plurality of fastening elements in the contact flange or in the construction of the brake hat of the brake disk, the brake disk may come into contact with the circumferential surface of the wheel hub and/or with the circumferential surface of the contact flange during assembly. By providing these surfaces with the thermally insulating coating, the thermal resistance of the heat conducting path from the brake disk to the wheel hub and in particular to the bearing lubricant of the wheel bearing may be further increased and the proportion of heat dissipated by thermal conduction to the support structure of the brake disk may be further reduced.

In one form, the contact surface is wholly provided with the thermally insulating coating.

In another form, the thermally insulating coating takes the form of an enamel coating. In this way, effective thermal resistance may be introduced into the heat conducting path from the brake disk to the wheel hub without producing local elements at the interface between the material of the brake disk and the material of the wheel hub, such that the formation of corrosion can be largely inhibited. Instead of an enamel coating, other heat-insulating materials or engineering materials may be used while still remaining within the scope of the present disclosure. However, these alternatives are for the most part not as thermally resistant and also not as hard. Hardness is important, though, since virtually no compressibility is desired at the flange.

The enamel may, without being limited thereto, contain a fused mixture of glass-forming oxides, for example silicon dioxide $SiO_2$, boron trioxide $B_2O_3$, sodium oxide $Na_2O$, potassium oxide $K_2O$, zirconium oxide $ZrO_2$, copper oxide $CuO$ and aluminum oxide $Al_2O_3$. In addition, the enamel may comprise fractions of borax, feldspar, fluoride, quartz, sodium carbonate and sodium nitrate. The enamel may comprise at least one further adhesion-promoting component such as for instance cobalt oxide, manganese oxide or nickel oxide. Oxides of titanium or molybdenum may additionally serve as opacifiers for the enamel. The enamel is conventionally produced from a dried enamel slip by applying temperatures of between 720° C. and 900° C.

In one form, the enamel contains around 50% to 80% $SiO_2$.

It is advantageous for the enamel to contain around 10% to 30% $ZrO_2$.

In another form, the enamel contains at least a fraction, in the range from 1% to 10%, of oxides selected from the group consisting of oxides $B_2O_3$, $Al_2O_3$, $CuO$ and $Na_2O$.

In one particularly advantageous form, the enamel contains around 65% $SiO_2$, 5% $B_2O_3$, 5% $Al_2O_3$, 18% $ZrO_2$, 5% $CuO$ and 2% $Na_2O$.

In another advantageous form, the thermally insulating coating has a film thickness which lies in a range between 150 μm and 700 μm, such as for example, between 200 μm and 600 μm or between 250 μm and 500 μm. With film thicknesses in this range, plastic deformation of the thermally insulating coating resulting from fastening the brake disk to the wheel hub and a consequent loosening of the brake disk fastening may be inhibited.

In a further form, the thermally insulating coating has a thermal conductivity $\lambda$ of less than 2.0 W/(m·K) at temperatures of above 350° C. In this way, a particularly high thermal resistance compared to the brake disk may be achieved in a heat conducting path for the heat potentially dissipatable by heat conduction from the brake disk into the wheel hub.

In an advantageous form, the thermally insulating coating has a thermal diffusivity $\lambda/(c \cdot \rho)$, (c: specific heat capacity, $\rho$: density) at temperatures of above 350° C. which amounts to less than 10%, such as for example, less than 5% or less than 2% of the thermal diffusivity of the material of the brake disk.

In one form of the wheel hub unit, the thermally insulating coating is free of antimony, gallium, indium, molybdenum, hafnium and bismuth and of rare earth metals and of compounds of the chemical elements listed. Rare earth metals include the chemical elements scandium, yttrium and lanthanum and the elements cerium, praseodymium, neodymium, promethium, samarium, europium, gadolinium, terbium, dysprosium, holmium, erbium, thulium, ytterbium and lutetium following lanthanum. The above-mentioned elements are included among the "strategically important metals." If use of these materials is avoided, largely unrestricted availability of materials for producing the thermally insulating coating can be provided.

In an advantageous form of the wheel hub unit, a brake disk made from at least one aluminum alloy is provided for detachable firm connection to the contact flange. For the purposes of the present disclosure, the expression "detachable firm connection" should be taken to mean that a fitter can reversibly make and break such a mechanical connection using a tool. In such a wheel hub unit, the above-mentioned advantages of the brake disk made from the aluminum alloy may be fully exploited, without running the risk of damaging the wheel bearing through overheating of the bearing lubricant or indeed damaging sensor units (ABS for example).

In particular, the brake disk made from the aluminum alloy may comprise a silicon fraction of more than 10%, such as for example, more than 20%, or more than 30%.

A further aspect of the present disclosure proposes a method for producing a wheel hub unit according to the present disclosure. The method is distinguished according to the present disclosure by at least the following steps:

providing a wheel hub blank of gray cast iron;

producing the contact surface of the contact flange by machining;

treating the contact surface by blasting with a blast material;

applying an enamel slip at least to parts of the contact surface;

drying the enamel slip;

heating the wheel hub blank to a temperature of above 720° C.; and finishing the wheel hub unit by machining to predetermined final dimensions.

The method according to the present disclosure may be used effectively to produce a wheel hub unit with the above-stated advantages.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
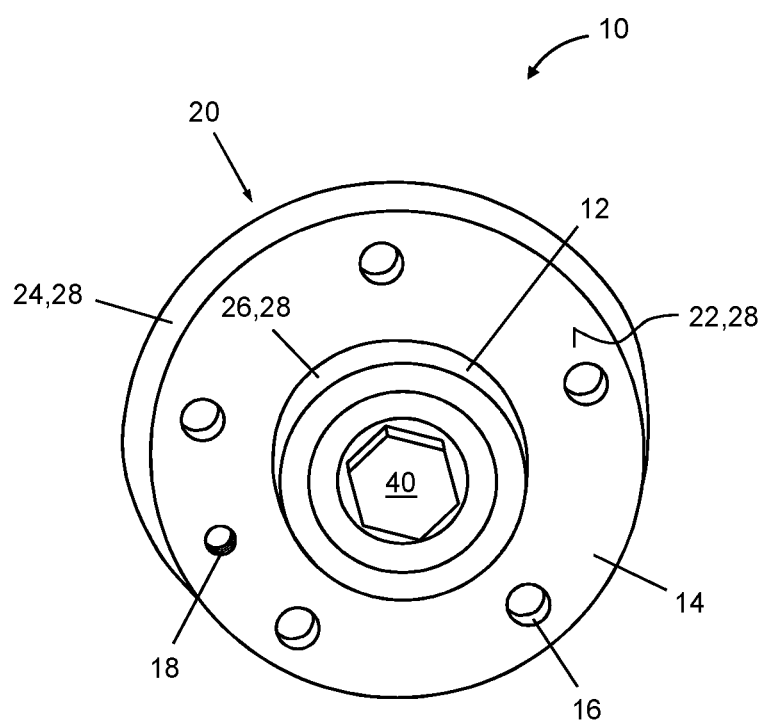
FIG. 1 is a perspective, schematic top view of a wheel hub unit without a brake disk according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows one possible form of a wheel hub unit 10 of a motor vehicle, which takes the form of a private car, without brake disk. The wheel hub unit 10 is intended for use at one end of a rear axle of the motor vehicle.

The wheel hub unit 10 comprises a wheel hub 12 and an annular contact flange 14 made in one piece with the wheel hub 12 and therefore connected firmly to the wheel hub 10 by material bonding. The contact flange 14 comprises a plurality of five fastening elements 16, which take the form of circular passage openings and are arranged at uniform angular intervals. Studs (not shown), by means of which a wheel rim (not shown) may be fastened to the wheel hub unit 10, may be inserted from the rear in a forward direction, i.e. towards the observer of FIG. 1, through the circular passage openings. The contact flange 14 is further provided with a threaded through-hole 18, which is intended to receive a centering screw 38 (FIG. 2) for fixing a brake disk 30 in place.

Referring to FIG. 1, the wheel hub unit 10 is secured at a front, hollow cylindrical end of the wheel hub 12 to the drive shaft (not shown) in the conventional manner using a hub-retaining nut 40.

The contact flange 14 comprises a contact surface 20, which includes a forwardly directed, annular surface 22 of the contact flange 14 and a circumferential surface 24 of the contact flange 14 and a part of a circumferential surface 26 of the wheel hub 12 which adjoins the forwardly directed, annular surface 22 of the contact flange 14.

Figure 2:
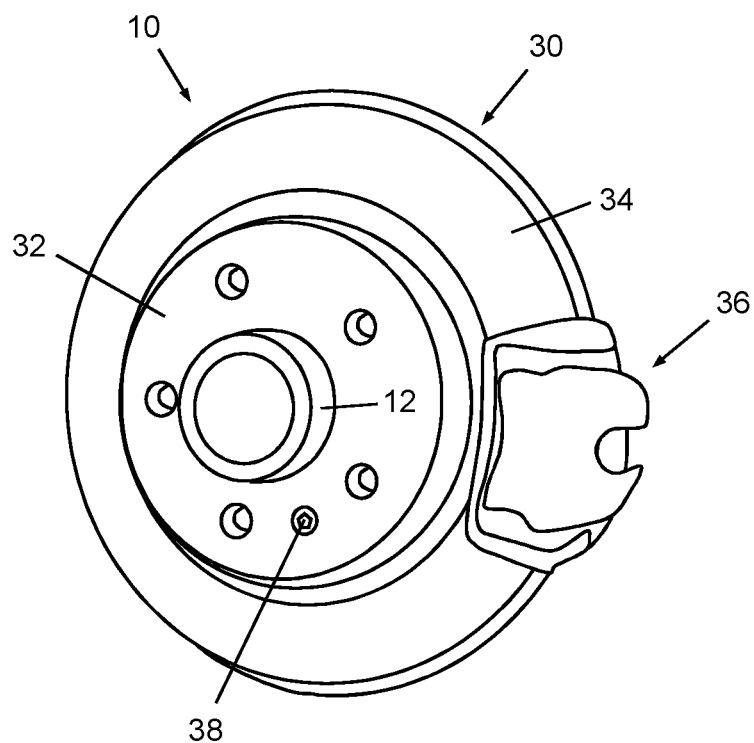
FIG. 2 is a perspective, schematic side view of a wheel hub unit with a brake disk installed according to the present disclosure.

The wheel hub unit 10 further comprises a brake disk 30 made from aluminum (FIG. 2). The brake disk 30 comprises, in a manner known per se, a brake hat 32 and a friction ring 34 with bilateral friction surfaces, which are gripped around, in a manner known per se, by a brake caliper 36 and brake pads (not shown) arranged therein. The brake caliper 36 is in this case fastened to a rear steering knuckle (not visible) of the motor vehicle.

The brake hat 32 has substantially the shape of a cylinder open at the back. A front cover of the cylindrical part comprises a central passage opening for centering and five fastening through-holes, the diameter and positions of which match those of the circular passage openings in the contact flange 14, such that the brake disk 30 is provided for detachable firm connection to the contact flange 14 by the studs. Moreover, the brake disk 30 is secured in the contact flange 14 with a centering screw 38. The brake hat 32 is wholly made, for example, from the aluminum forge alloy with material number EN AW-6061 (AlMg1SiCu).

The friction ring 34 is connected in one piece to an edge region of the brake hat 32, which is arranged at the rear end of the cylindrical part, and preponderantly comprises, for example, an aluminum alloy AlSi20Fe5Ni2 with a silicon content of 20%.

The thermal conductivity of the aluminum alloy used to produce the brake disk lies in a range from 100-150 W/(m·K).

Figure 3:
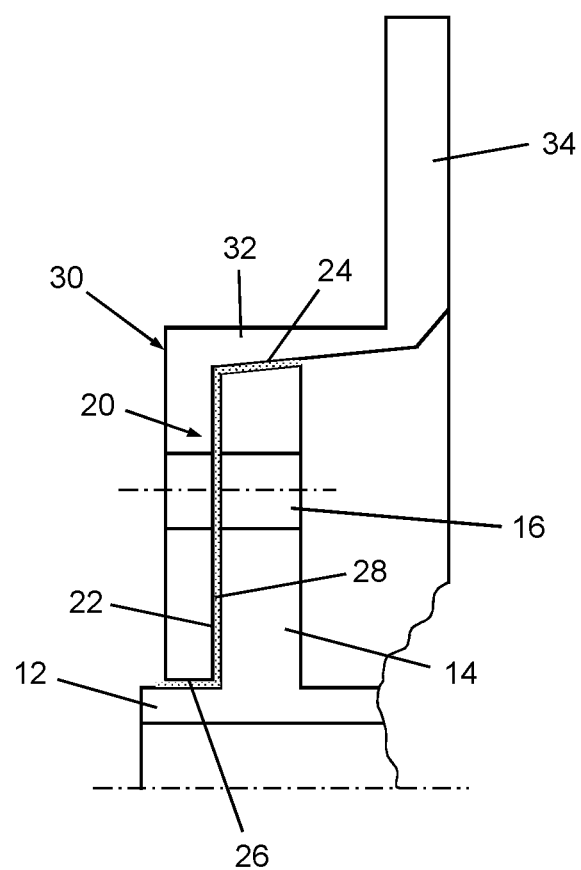
FIG. 3 is a partial lateral, sectional view of the wheel hub unit of FIG. 2.

As shown in FIG. 3, when the brake disk 30 is in the installed state, the contact surface 20 of the contact flange 14 comes into mechanical contact at least in part with the brake hat 32 of the brake disk 30.

Other brake disks or fastening procedures may of course also be used. The nub of the present disclosure is that heat transfer from the brake into the wheel bearing is at least reduced.

The entire contact surface 20 of the contact flange 14 (FIGS. 1 and 3) is provided with a thermally insulating coating 28. The thermally insulating coating 28 takes the form of an enamel coating and has a film thickness of 450 μm. At temperatures of above 350° C., the enamel coating has a thermal conductivity of less than 2.0 W/(m·K).

For production, the material was deliberately selected such that the thermally insulating coating 28 is free of antimony, gallium, indium, molybdenum, hafnium and bismuth and of rare earth metals and of compounds of the chemical elements listed.

It is apparent from FIG. 3 that the proportion of frictional heat arising in the friction ring 34 of the brake disk 30 which can be dissipated by thermal conduction flows along a heat conducting path which leads from the friction ring 34 into the brake hat 32 and from there through the thermally insulating coating 28 either via the contact flange 14 or directly into the wheel hub 12.

Thanks to the comparatively low thermal conductivity, the thermally insulating coating 28 provides a thermal resistance through which the proportion of frictional heat dissipatable by thermal conduction is reduced in comparison with a configuration without the thermally insulating coating 28. In this way, the wheel hub 12 and in particular the wheel bearing connected thereto and the lubricant contained in said bearing are effectively protected from overheating. The temperature difference is compensated by an increase in the proportion of frictional heat dissipatable by natural or forced convection and in the proportion of frictional heat dissipatable by heat radiation.

In the case of transient (non-steady-state) heat transfer processes, as are to be expected for example in the event of hard braking with an initially cool brake disk, the thermally insulating coating 28 brings about slower heat propagation from the brake disk 30 heated by the braking operation to the wheel hub 12 or the wheel bearing due to its low thermal diffusivity compared with the material of the brake disk 30.

Figure 4:
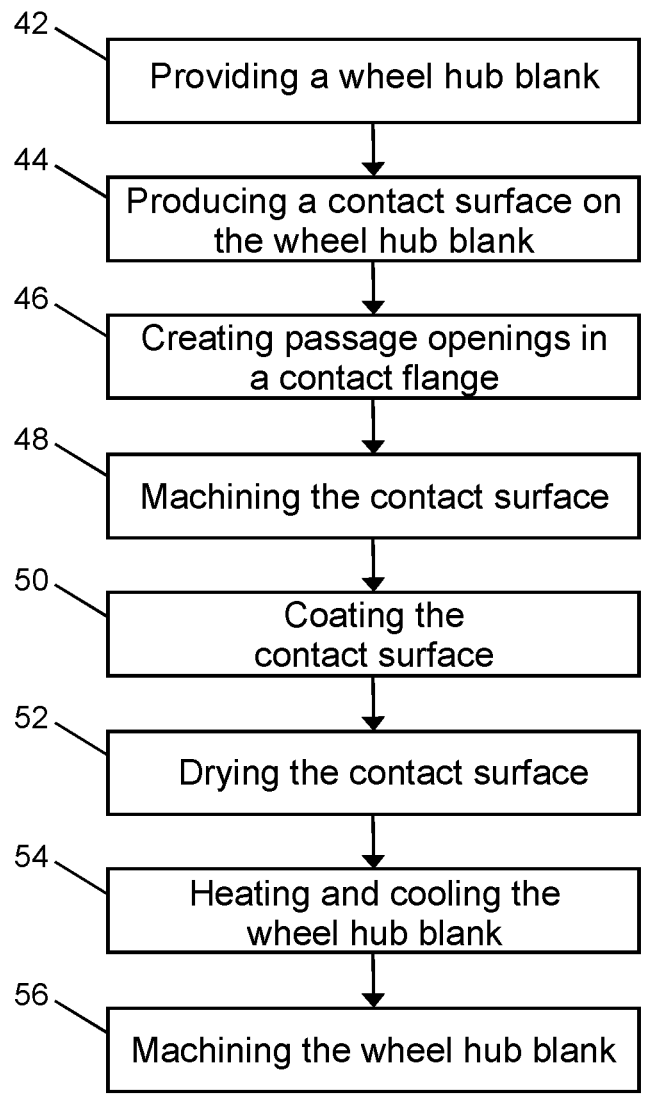
FIG. 4 is a flow chart of a method of producing a wheel hub unit according to the present disclosure.

One possible form according to the present disclosure of a method for producing the wheel hub unit 10 is described below. A flow chart of the method is shown in FIG. 4. The reference numerals indicated for objects in the description of the method apply to FIGS. 1 to 3.

In a first step 42 of the method, a wheel hub blank of gray cast iron is provided. In the next step 44, the contact surface 20 of the contact flange 14 is produced by machining, namely by turning. Then, in a further step 46, the passage openings 16 in the contact flange 14 are produced, for example by drilling.

This is followed by a step 48 for treatment the contact surface 20 by blasting with a blast material, such that the contact surface 20 is prepared for the subsequent coating with enamel.

In a further step 50, an enamel slip is applied to the entire contact surface 20 and dried in a subsequent step 52. In a further step 54, the wheel hub blank is heated for a few minutes in a suitable furnace to a temperature of 850° C., whereby vitrification occurs on the contact surface 20. After cooling, the wheel hub unit 10 is finished in a further step 56 of the method by machining to predetermined final dimensions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A wheel hub unit comprising:
    a wheel hub; and
    a contact flange connected to the wheel hub and comprising a contact surface configured to come into mechanical contact with at least one part of a brake hat of a brake disk when the brake disk is in a mounted state,
    wherein the contact surface includes a thermally insulating coating on a radially outward facing surface of the wheel hub and a radially outward facing surface of the contact flange that is configured to come into mechanical contact with the brake hat, the thermally insulating coating configured to reduce heat transfer between the radially outward facing surface of the contact flange and the brake hat upon mechanical contact with the brake hat,
    wherein the thermally insulating coating has a thermal conductivity of less than 2.0 W/(m·K) at a temperature above 350° C.

2. The wheel hub of claim 1, wherein the contact flange includes a plurality of fastening elements configured to fasten the wheel hub unit to a wheel rim.

3. The wheel hub unit of claim 1, wherein all of the contact surface includes the thermally insulating coating and the thermally insulating coating is an enamel coating.

4. The wheel hub unit of claim 3, wherein the enamel coating comprises 50% to 80% $SiO_2$.

5. The wheel hub unit of claim 3, wherein the enamel coating comprises 10% to 30% $ZrO_2$.

6. The wheel hub unit of claim 3, wherein the enamel coating comprises 1% to 10% oxide selected from the group consisting of oxides $B_2O_3$, $Al_2O_3$, CuO, and $Na_2O$.

7. The wheel hub unit of claim 3, wherein the enamel coating comprises 65% $SiO_2$, 5% $B_2O_3$, 5% $Al_2O_3$, 18% $ZrO_2$, 5% CuO and 2% $Na_2O$.

8. The wheel hub unit of claim 1, wherein the thermally insulating coating defines a film thickness between 150 μm and 700 μm.

9. The wheel hub unit of claim 1, wherein the thermally insulating coating is free of antimony, gallium, indium, molybdenum, hafnium, bismuth, rare earth metals, and compounds thereof.

10. The wheel hub unit of claim 1, wherein the brake disk made from at least one aluminum alloy is detachably connected to the contact flange.

11. A wheel hub unit comprising:
    a wheel hub;
    a contact flange connected to the wheel hub; and
    a contact surface formed by a radially outward facing surface and an annular surface of the contact flange and part of a radially outward facing surface of the wheel hub, wherein the radially outward facing surface of the contact flange and the radially outward facing surface of the wheel hub forming the contact surface includes a thermally insulating coating, the radially outward facing surface of the contact flange is configured to come into mechanical contact with a brake hat, the thermally insulating coating configured to reduce heat transfer between the radially outward facing surface of the contact flange and the brake hat upon mechanical contact with the brake hat;
    wherein the thermally insulating coating has a thermal conductivity of less than 2.0 W/(m·K) at a temperature above 350° C.

12. The wheel hub unit of claim 11, further comprising a brake disk having the brake hat and detachably connected to the contact flange, wherein the radially outward facing surface of the contact surface is configured to come into mechanical contact with the brake hat of the brake disk such that the thermally insulating coating is disposed between the contact surface and the brake hat.

13. The wheel hub unit of claim 12, wherein the thermally insulating coating of the contact surface has a thermal diffusivity of less than 10% of a thermal diffusivity of a material of the brake disk at a temperature above 350° C.

14. The wheel hub unit of claim 11, wherein a thickness of the thermally insulating coating is between 150 μm and 700 μm.

15. The wheel hub unit of claim 11, wherein a thickness of the thermally insulating coating is between 200 μm and 600 μm.

16. The wheel hub unit of claim 11, wherein all of the contact surface includes the thermally insulating coating and the thermally insulating coating is an enamel coating.

17. The wheel hub unit of claim 16, wherein the enamel coating comprises:

50% to 80% $SiO_2$;
10% to 30% $ZrO_2$; and
1% to 10% oxide selected from the group consisting of oxides $B_2O_3$, $Al_2O_3$, CuO, and $Na_2O$.

18. The wheel hub unit of claim 17, wherein the enamel coating comprises 65% $SiO_2$, 18% $ZrO_2$, 5% $B_2O_3$, 5% $Al_2O_3$, 5% CuO and 2% $Na_2O$.

* * * * *